(12) United States Patent
Braunbeck et al.

(10) Patent No.: US 8,052,184 B2
(45) Date of Patent: Nov. 8, 2011

(54) CRASHBOX AND DAMPING ARRANGEMENT WITH CRASHBOX

(75) Inventors: Bardo Braunbeck, Oppenheim (DE); Theobald Hock, Grossostheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 368 days.

(21) Appl. No.: 12/295,587

(22) PCT Filed: Mar. 30, 2007

(86) PCT No.: PCT/EP2007/053104
§ 371 (c)(1),
(2), (4) Date: Sep. 30, 2008

(87) PCT Pub. No.: WO2007/115952
PCT Pub. Date: Oct. 18, 2007

(65) Prior Publication Data
US 2010/0230983 A1 Sep. 16, 2010

(30) Foreign Application Priority Data
Apr. 5, 2006 (DE) .......................... 10 2006 015 876

(51) Int. Cl.
*B60R 19/34* (2006.01)
(52) U.S. Cl. .................... 293/133; 293/132; 293/155
(58) Field of Classification Search .............. 293/132, 293/133, 155; 296/187.03, 187.09, 187.11; 188/377
See application file for complete search history.

(56) References Cited

U.S. PATENT DOCUMENTS

| | | | |
|---|---|---|---|
| 6,106,039 A * | 8/2000 | Maki | 293/132 |
| 6,334,638 B1 | 1/2002 | Yamamuro | |
| 6,371,541 B1 | 4/2002 | Pedersen | |
| 6,523,885 B2 | 2/2003 | Kroening et al. | |
| 7,070,217 B2 * | 7/2006 | Longo | 293/132 |
| 7,093,866 B2 * | 8/2006 | Toneatti et al. | 293/133 |
| 7,201,413 B2 * | 4/2007 | Hillekes et al. | 293/133 |

(Continued)

FOREIGN PATENT DOCUMENTS
DE 9419691 U1 4/1995
(Continued)

OTHER PUBLICATIONS
German Patent Office, German Search Report for Application No. 102006015876.8, dated Dec. 19, 2006.
(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A base-plate-less crashbox is provided for absorbing impact energy, which is suitable for insertion into a corresponding support frame, in particular, a motor vehicle support frame, and has a deformable profile. The base-plate-less crashbox includes, but is not limited to at least one first chamber and a second chamber formed adjacent thereto which are each surrounded by a wall of the profile. One of the chambers is formed such as to be shorter in the direction of insertion so that the other chamber has a protruding portion which is adapted to be inserted into the corresponding support frame in order to realize a coupling between the crashbox and the support frame. The protruding portion has at least one first connecting means for connecting the protruding portion to the support frame.

12 Claims, 3 Drawing Sheets

U.S. PATENT DOCUMENTS

| | | | |
|---|---|---|---|
| 7,201,414 B2 * | 4/2007 | Iketo et al. | 293/133 |
| 7,252,314 B2 * | 8/2007 | Tamura et al. | 293/133 |
| 7,312,491 B2 | 12/2007 | Ufert et al. | |
| 7,357,445 B2 * | 4/2008 | Gross et al. | 296/187.09 |
| 7,401,825 B2 * | 7/2008 | Frank et al. | 293/155 |
| 7,407,206 B2 * | 8/2008 | Arns et al. | 293/133 |
| 7,445,097 B2 * | 11/2008 | Tamura et al. | 188/377 |
| 7,494,167 B2 * | 2/2009 | Braunbeck et al. | 293/133 |
| 7,503,603 B2 * | 3/2009 | Braunbeck et al. | 293/133 |
| 7,617,916 B2 * | 11/2009 | Heatherington et al. | 188/371 |
| 7,748,507 B2 * | 7/2010 | Canot et al. | 188/377 |
| 7,766,403 B2 * | 8/2010 | Alvarsson et al. | 293/133 |
| 7,810,868 B2 * | 10/2010 | Braunbeck et al. | 296/187.03 |
| 2007/0176442 A1 * | 8/2007 | Mori et al. | 293/133 |
| 2010/0194125 A1 * | 8/2010 | Wibbeke et al. | 293/120 |
| 2010/0230983 A1 * | 9/2010 | Braunbeck et al. | 293/133 |

FOREIGN PATENT DOCUMENTS

| | | |
|---|---|---|
| DE | 19545069 A1 | 4/1997 |
| DE | 19603954 A1 | 8/1997 |
| DE | 19731342 A1 | 1/1999 |
| DE | 10041064 A1 | 4/2001 |
| DE | 10126065 A1 | 2/2002 |
| DE | 69904042 T2 | 10/2003 |
| DE | 10349204 A1 | 6/2005 |
| DE | 102004008741 A1 | 7/2005 |
| DE | 102004060088 B3 | 2/2006 |
| DE | 102005008321 A1 | 8/2006 |
| EP | 1160133 A2 | 12/2001 |
| EP | 1384536 A2 | 1/2004 |
| EP | 1630448 A1 | 3/2006 |
| JP | 11208392 | 8/1999 |
| WO | 2004113131 A1 | 12/2004 |

OTHER PUBLICATIONS

International Searching Authority, International Search Report for Application No. PCT/EP2007/053104, dated Jul. 19, 2007.

* cited by examiner

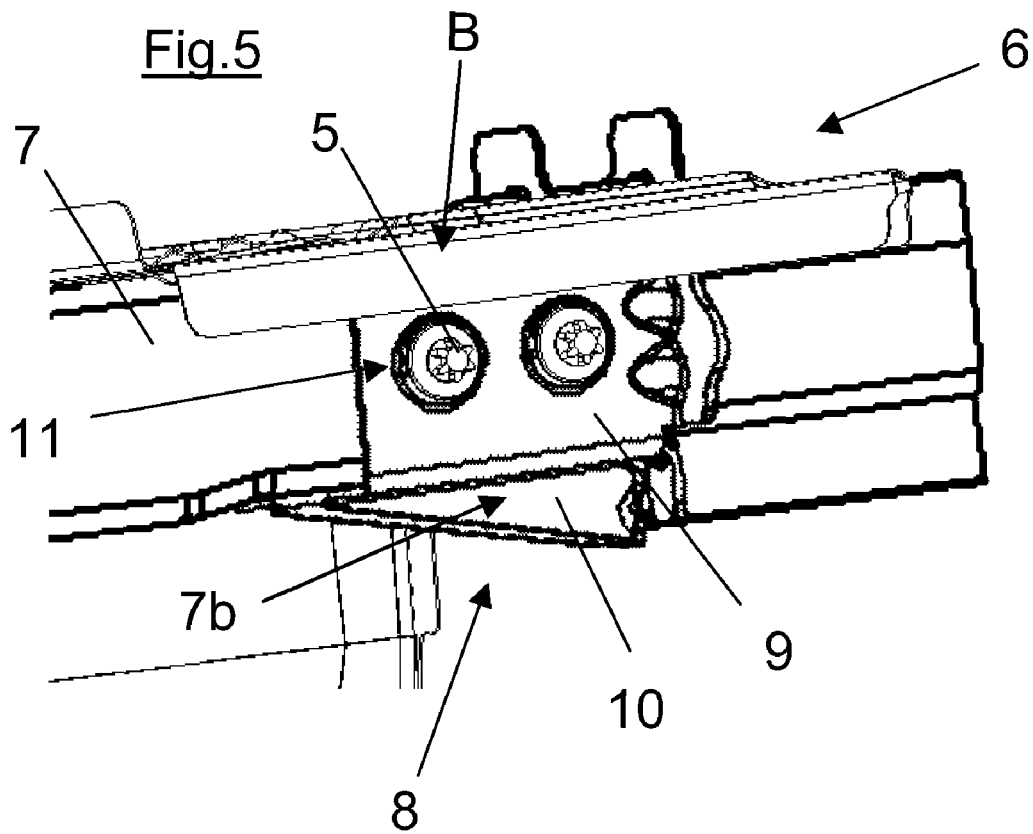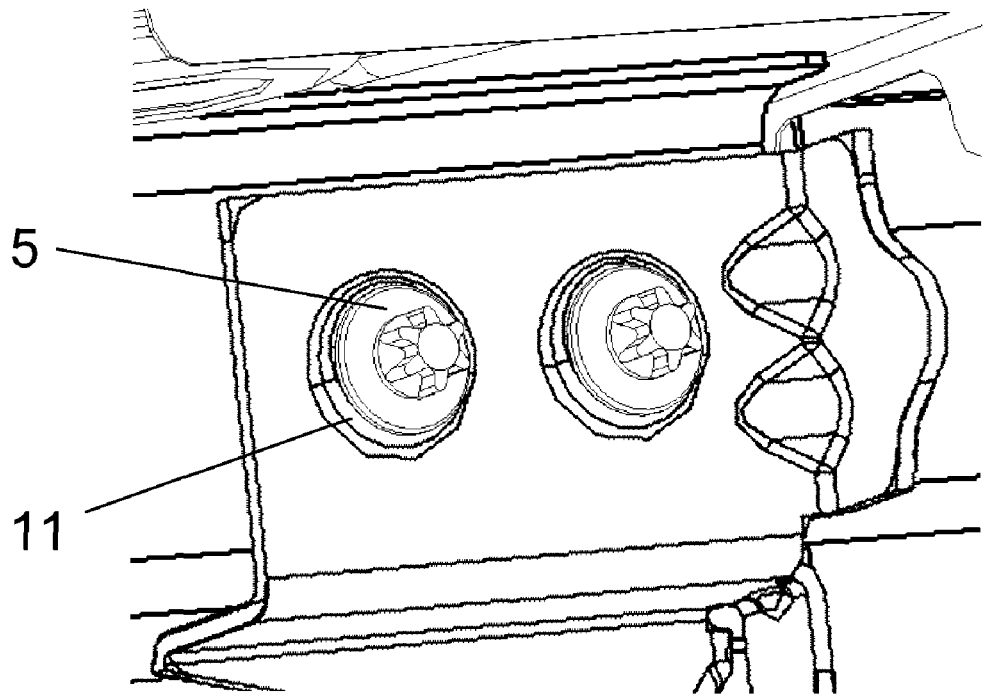

CRASHBOX AND DAMPING ARRANGEMENT WITH CRASHBOX

CROSS-REFERENCE TO RELATED APPLICATIONS

This application is a U.S. National-Stage entry under 35 U.S.C. §371 based on International Application No. PCT/EP2007/053104, filed Mar. 30, 2007, which was published under PCT Article 21(2) and which claims priority to German Application No. 102006015876.8, filed Apr. 5, 2006, which are all hereby incorporated in their entirety by reference.

TECHNICAL FIELD

The present invention relates to a base-plate-less crashbox and a damping arrangement with crashbox.

BACKGROUND

Motor vehicle crashboxes serve the purpose of absorbing a large proportion of the kinetic energy which arises during a crash or an impact in the course of an insurance crash test or other crash tests so that the vehicle structure located behind the point of entry for the kinetic energy remains intact, and the vehicle gets a good damage-type classification.

Crashboxes of the most diverse type are known, these usually being flange mounted onto the motor vehicle chassis, the front frame or the rear frame, by means of a base plate. A peripheral framework flange is needed for these solutions. Hereby, the connection between the base plate and the framework is effected by means of at least one bolted connection which is bolted on substantially in the longitudinal direction of the vehicle, this then mostly leading to an impairment of the bumper bracket cross section because the location of the bolted connection is accessible. In addition, such crashboxes are put together from several metal plates, and in particular, are welded together. Then, if crashboxes of different lengths are needed for different types of motor vehicle, new tools are necessary for each type of motor vehicle.

Other crashboxes envisage that they be in the form of a push-in solution whereby the height of the crashbox that is to be inserted exactly matches that of the rear frame or the front frame so that the bolted connection, which is always vertical, can produce the necessary grip in order to ensure that the force is introduced into the framework from the crashbox. In this design, the vertical bolts must be screwed through the floor plate, this thereby leading to the installer's body adopting an unergonomic position when threading them in during the assembly process. In addition, the bolted connection must be sealed since this leads into the interior and no externally penetrating materials such as water are permitted to enter therein.

From EP 1 384 536, there is known a crashbox for motor vehicles and a method for the manufacture of this crashbox. This solution provides a method for the manufacture of a crashbox for motor vehicles based on a semi-finished sheet metal product as well as a crashbox for motor vehicles having a multiple chamber profile. Hereby, the semi-finished sheet metal product is transformed by bending or folding it into a multiple chamber profile, in particular, a double chamber profile.

The disadvantage of this solution is that several processing steps are necessary for manufacturing the double chamber profile. In addition, in this solution, a mounting plate must be provided in order to realize a stable crashbox. In this solution, furthermore, the attachment to the framework is made by means of vertical bolted connections.

In view of the foregoing, at least one object of the present invention is to produce a crashbox or a damping arrangement for absorbing impact energy with a crashbox which is usable for different types of motor vehicle having different frame systems and which can, in particular, be easily produced and installed. In addition, other objects, desirable features, and characteristics will become apparent from the subsequent summary and detailed description, and the appended claims, taken in conjunction with the accompanying drawings and this background.

SUMMARY

An embodiment of the invention incorporates the technical teaching that a base-plate-less crashbox for absorbing impact energy that is suitable for insertion into a corresponding support frame, in particular a motor vehicle support frame, and having a deformable profile comprises at least one first chamber and a second chamber formed adjacent thereto and these each being surrounded by a wall of the profile. The chambers are formed such as to be shorter in the direction of insertion so that the other chamber has a protruding portion which is adapted to be inserted into the corresponding support frame in order to realize a coupling between the crashbox and the support frame. The protruding portion has at least one first connecting means for connecting the protruding portion to the support frame.

The crashbox has a deformable profile which, to a large extent, absorbs the energy occurring in the event of a crash due to the deformation process. The deformable profile comprises at least one first chamber and a second chamber formed adjacent thereto so that the profile is approximately in the form of a tube having chambers running in the longitudinal direction. The chambers are surrounded by walls. The profile with the tubular chambers that is formed in such a way can have any geometrical cross section but it is preferably in the form of a rectangular, trapezoidal or circular cross section. One of the chambers is formed such as to be shorter in the direction of insertion or in the longitudinal direction of the tube axis than the other chamber. Consequently, the longer chamber is provided with a protruding portion which can be inserted into an appropriate opening in a support frame. By contrast, the shorter chamber provides a stop so that, in the course of the insertion process, the length of insertion is defined precisely by the protruding portion or the stop.

Since the insertion process alone is not sufficient to provide a secure connection between the crashbox and the support frame, the protruding portion comprises at least one first connecting means which is suitable for further connecting the protruding portion to the support frame. In particular, inadvertent movement of the crashbox out of the support frame can be prevented in such a manner.

The crashbox can be used for different types of motor vehicle due to its ability to be inserted, whereby it can be arranged on the support frame by means of a simple insertion process. A firm connection is obtained with the aid of the connecting means which are formed so as to be easily accessible.

Preferably, the first connecting means is in the form of a substantially horizontally effective connecting means. Due to this substantially horizontally effective alignment, the connecting means does not have to be mounted in a direction towards the floor of the motor vehicle and possibly through the floor, but can be aligned substantially parallel to the floor of the motor vehicle. Hereby for example, no additional sealing of the floor of the motor vehicle is necessary and lateral accessibility to the motor vehicle is simplified.

Moreover, it is preferred that the first connecting means be in the form of a through opening in order to realize a connection that, taken in conjunction with at least one second connecting means, is selected from the group comprising plug-in and/or bolted connections.

Thus, the crashbox can be inserted into the opening in the support frame and realized by means of an appropriate connection such as a bolted connection for example. This choice of connection can also be easily automated and perhaps employed in a partially or fully automated production line.

Moreover, the profile of the crashbox is preferably formed in one-piece. Hereby, no further complex assembly steps for the production of the different chambers of the crashbox are needed, for example, processes for connecting several chambers together are not needed.

It is preferred that the profile be manufactured by means of an extrusion process or the like. The profile can then be formed in problem-free manner by means of a matrix and it can be manufactured in large quantities. The shortening of at least one of the chambers to a given length can easily be effected by means of a stamping or some other removal process. For this purpose, just a single further step is necessary (i.e., cutting or separating-off the surplus portion).

To this end, it is preferred that the profile be formed from an extrudable material that is selected from the group comprising metals, aluminum and the like. In addition, this material has the advantage that when absorbing energy, it then deforms optimally and thereby absorbs the greater part of the energy.

In order to obtain the appropriate deformation, it is preferred that the wall, which surrounds the chambers, should have different wall thicknesses for different degrees of deformation. Thus, for example, an aid to the folding process can be realized if the profile folds-up in the event of an accident. Due to the differing material thicknesses for the various walls, a folding process can be deliberately initiated should an accident occur without the need for additional components.

A preferred embodiment envisages that the profile should have a third chamber which is likewise shortened with respect to the chamber having the protruding portion and is arranged relative to the other two chambers in such a manner that the chamber with the protruding portion is arranged between the two shortened chambers in sandwich-like manner. In this way, there are provided two stop means which enable the profile to be supported on the support frame. Additional stability is thereby achieved. In addition, the profile can be aligned with the motor vehicle framework in a more precise manner.

Furthermore, the invention incorporates the technical teaching that a damping arrangement for absorbing impact energy especially for a motor vehicle comprises: a support frame including a seating opening for the insertion of a crashbox and a crashbox in accordance with an embodiment of the invention. The inner contour of the seating opening substantially corresponds to the outer contour of the protruding portion of the crashbox in order to seat the crashbox by means of a process of inserting the protruding portion into the seating opening. The outer contour of the middle chamber or the chamber with the protruding portion, or more precisely, the contour of the protruding portion is of substantially the same shape as the inner contour of the opening in the rear frame or the front frame in the corresponding region.

Hereby, there can, inter alia, be slight deviations in regard to the contours due to tolerances, for example.

In order to enable the crashbox to be mounted on the frame despite the occurrence of such tolerances, the middle chamber has a slightly smaller height than the opening in the framework so as to allow the insertion process to be effected more easily from a somewhat higher position or at a somewhat higher position.

In particular, the rear frame has a trapezoidal contour which also necessarily leads to the seating opening having a trapezoidal contour for optimal matching purposes.

Thus, the cross section of the outer contour of the middle chamber or the chamber with the protruding portion is of substantially the same shape as the inner contour of the rear frame at least in the lower part thereof. In order to simplify the installation process despite possibly occurring tolerances, the chamber with the protruding portion has a slightly smaller height than the corresponding seating opening in the support frame in order to facilitate the plug-in or insertion process at a higher position. The trapezoidal shape of the support frame, which is preferably a rear frame, leads to the creation of an air gap between the crashbox and the support frame when the crashbox is introduced at the higher position. When the crashbox reaches its end position, and in particular the vertical end position thereof, this air gap is reduced. The alignment of the crashbox relative to the support frame in the end position can be additionally assisted by means of an additional bolted connection or some other connecting means, whereby this preferred bolted connection then pulls the crashbox downwardly in the direction of the bottom of the seating opening until the crashbox rests upon the bottom of the seating opening in the support frame.

Furthermore, it is preferred that there be second connecting means which corresponds to the first connecting means of the crashbox and cooperates therewith in order to realize an additional connection between the support frame and the crashbox. The first connecting means and the second connecting means are aligned substantially in the horizontal direction. Consequently, the main attachment of the crashbox to the frame is effected by means of a horizontal bolted connection or the like which passes through the rear frame and forms a force-transmitting connection to the crashbox. In consequence, the horizontal connection and in particular the horizontal bolted connection represents the main attachment of the crashbox to the rear frame. The connection (means) runs crosswise through the rear frame. Appropriate reinforcing means should be provided in order to prevent the connection and in particular the bolted connection from swelling the material of the frame when forces are produced therein due to an impact.

In consequence, it is preferred that the damping arrangement comprise further reinforcing means comprising a reinforced area on the outer contour of the support frame in the region in which the connecting means are mutually effective, in order to prevent and/or reduce inadvertent damage in this region that is affected or is adapted to be affected by the connecting means. For example, due to a connection by means of bolts, the material of the frame could splay out and thus lead to unwanted deformations when forces are introduced therein by an impact. In order to prevent this and other forms of damage, certain types of reinforcement should be provided. Preferably, the reinforced area is welded and, in the seating area for the connecting means (e.g., the bolt heads), it is shaped in such a way as to result in a bearing surface that is at right-angles to the bolting direction or the effective direction of the connecting means in order to compensate for the side walls of the frame being angled because of the trapezoidal shape or being at an angle due to the removal thereof from a mould for example. In order to distribute an introduced force uniformly over the entire cross section of the rear frame or the entire cross section of the front frame, the cut-back chambers are supported on the vehicle structure in the longitudinal direction. The upper chamber thereby introduces the force with the horizontal wall directly into the floor flange. In the case of a three-chamber profile, the lower chamber is supported on the rear frame reinforcement which extends the rear frame in the downward direction and forms a larger supporting base.

In one exemplary embodiment, there can be formed from the horizontal wall of the lower chamber or the floor, in the case of a three-chamber profile for example, a vertical flange which is bolted to the downwardly extended framework shoe/reinforcement. Moreover, a plastic plate can be provided for distributing the introduced forces from the profile edges into the structure. It is also possible to cut open the upper and lower wall of the outer chambers and bend the edges inwardly so as form a closed chain for the outer chambers, this being done in such a way as to realize uniform introduction of the force. Hereby, the lateral walls of the outer chambers can be formed such as to be slightly concave. For the purposes of achieving uniform folding of the crashbox in the event of an impact, the non-symmetrical nature of the aluminum profile, which represents one of the special advantages of aluminum extruded profiles in this application, can be compensated by virtue of the individual chambers having slightly different wall thicknesses.

BRIEF DESCRIPTION OF THE DRAWINGS

The present invention will hereinafter be described in conjunction with the following drawing figures, wherein like numerals denote like elements.

FIG. 5 a schematic, perspective view of another section of a damping arrangement in accordance with FIG. 4 from another angle; and FIG. 6 a schematic, perspective view of a section of the damping arrangement which shows the connecting means on an enlarged scale.

DETAILED DESCRIPTION

The following detailed description is merely exemplary in nature and is not intended to limit application and uses.

Figure 1:
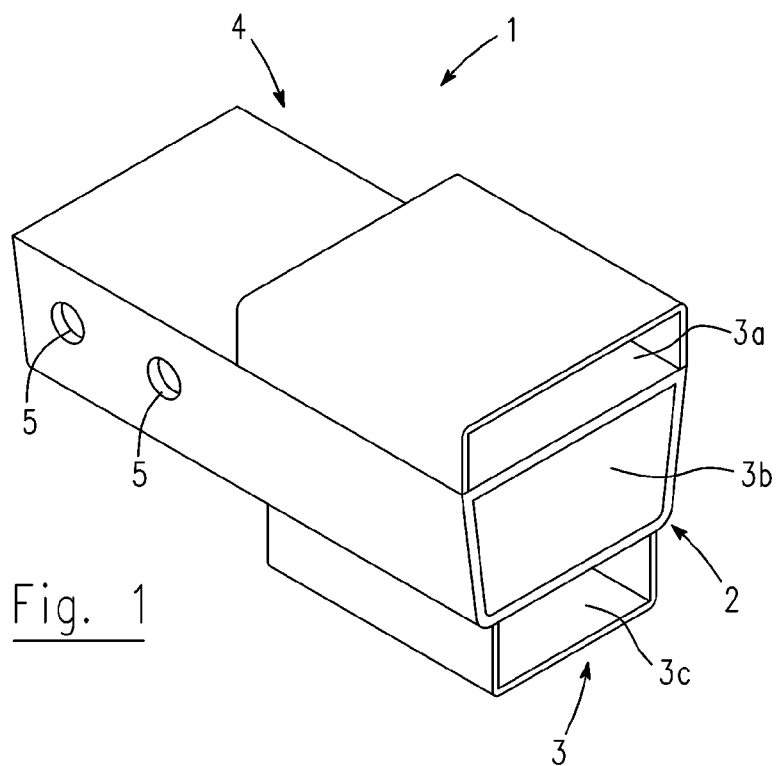
FIG. 1 shows a schematic, perspective view of a crashbox in accordance with an embodiment of the invention with three chambers.

FIG. 1 shows a schematic, perspective view of a crashbox 1 in accordance with an embodiment of the invention. The crashbox 1 is manufactured in a continuous casting process and comprises a profile 2 with three chambers 3, an upper first chamber 3a, a middle second chamber 3b and a lower third chamber 3c. The profile 2 is formed by a wall which surrounds the chambers 3. The chambers 3 are formed such as to be tubular lengthwise in the direction of insertion or the direction of the continuous casting process. The first and third chamber 3a, 3c or the wall surrounding them is shorter than the second chamber 3b or the wall surrounding it in this direction of insertion or longitudinal direction so that a protruding portion 4 is formed. The protruding portion 4 is formed such as to be inserted into an opening in a support frame. The end faces of the shorter chambers 3a, 3c form a kind of stop means with reference to the direction of insertion. Connecting means 5 in the form of a through opening running substantially horizontally relative to an imaginary plane through the floor of the motor vehicle are formed on the protruding portion 4. The through openings, or more precisely, the two through-bores are intended, in particular, for the connection of the crashbox 1 to a support frame of the motor vehicle and are meant to form an additional securing means for the crashbox 1 when inserted into an opening in the support frame in the assembled state. As is also evident from FIG. 2, the chambers 3 differ in regard to the profile cross sections thereof, although the first and the third chamber 3a, 3c are substantially equally long in terms of their length in the direction of insertion.

Figure 2:
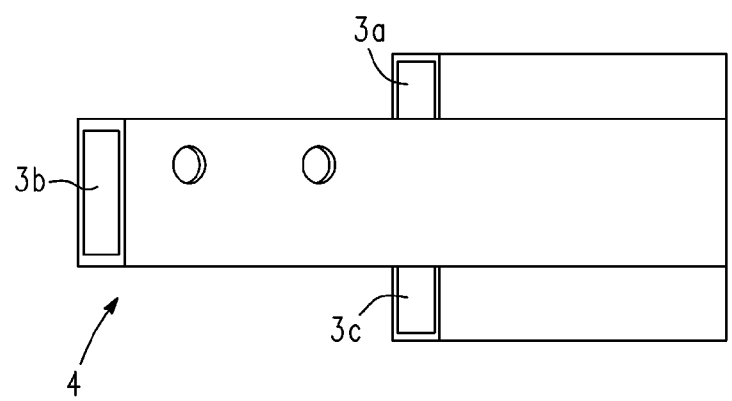
FIG. 2 a schematic, perspective view of the crashbox in accordance with FIG. 1 from another angle.

FIG. 2 shows a schematic, perspective view of the crashbox 1 in accordance with FIG. 1 from another angle. It is clearly apparent there from that the lengths of the first and the third chamber 3a, 3c are approximately equal long, whereas the length of the second chamber 3b significantly exceeds that of the chambers 3a, 3b in terms of the length thereof in the direction of insertion. The end faces of the chambers 3a, 3b, 3c are substantially flush at the end thereof opposed to the direction of insertion. The protruding portion 4 may be of any length, but here however, it is just about as long as or longer than the chambers 3a, 3c.

As previously mentioned, the crashbox is manufactured by means of a continuous casting process. Now in order to form the different lengths, the crashbox 1 that was originally formed with equally long chambers has been cut or separated along the broken lines in a cutting or a separation process and the corresponding parts of the chambers or the wall were removed. The pattern represented by the broken lines can be adapted in accord with the desired final contour in each case.

One can also perceive the two substantially horizontally extending through openings. They have a circular cross-section, whereby in principle however, it is also conceivable for them to have any other cross section. The through openings run transversely to the direction of insertion through the entire profile or the second chamber 3b.

Figure 3:
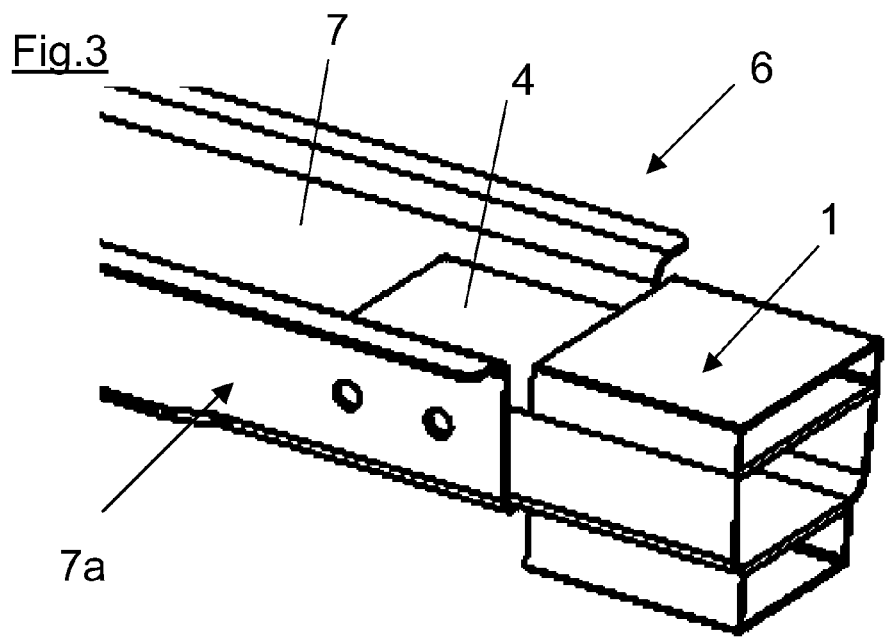
FIG. 3 a schematic, perspective view of a section of a damping arrangement with support frames and a crashbox in accordance with FIG. 1.

FIG. 3 now shows a schematic, perspective view of a section of a damping arrangement 6 with a support frame 7 and a crashbox 1 in accordance with FIG. 1. The support frame 7, which is in the form of an open rear frame of a motor vehicle here, comprises a seating opening that is formed in the longitudinal direction (i.e., in the direction of insertion). The inner contour thereof has a cross section which corresponds at least partially to the outer contour of the crashbox 1 that is to be inserted or more precisely, the protruding portion 4 thereof. In particular, the rear frame part 7a corresponded to the protruding portion 4 the crashbox 1. For the purposes of clarifying the arrangement in the present case, the seating opening of the support frame 7 is not illustrated as being peripherally closed, but rather, is illustrated as being upwardly open. Although such an at least partially upwardly open construction is also theoretically possible, it is however preferred that the seating opening of the support frame 7 be formed such as to be peripherally closed. In particular, in regard to the required rigidity or firmness, the peripherally closed construction of the seating opening in the support frame is preferred. The seating opening in the support frame has substantially the same cross section as the protruding portion 4 of the crashbox 1. The cross section of the seating opening in the support frame is formed in accord with the desired degree of play between the two parts, although it is preferable that there is a small amount of play.

Figure 4:
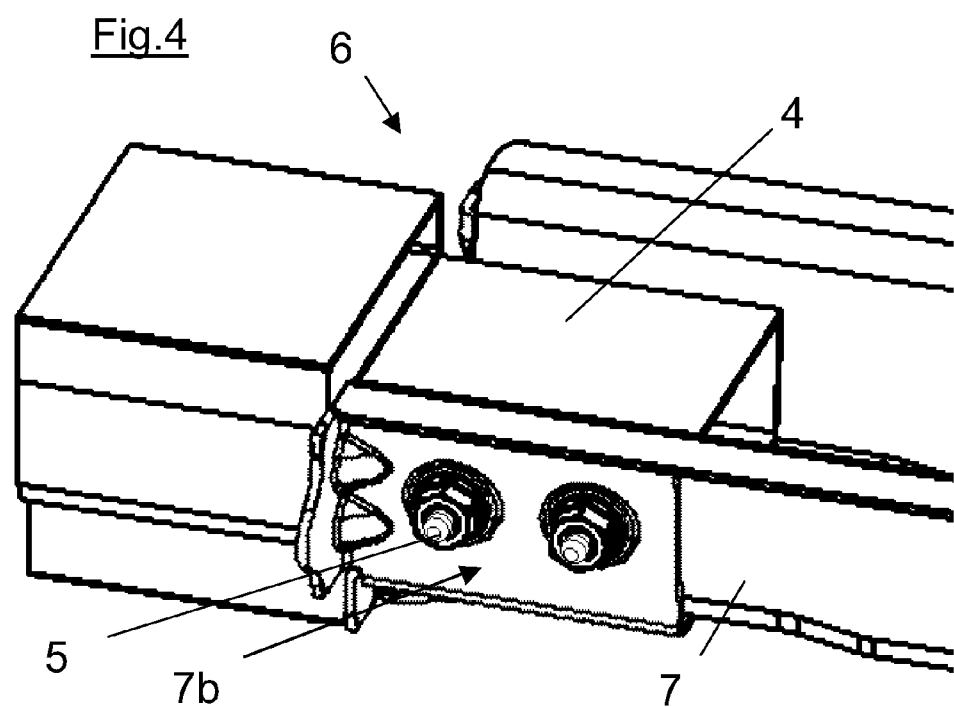
FIG. 4 a schematic, perspective view of another section of a damping arrangement with support frames, a crashbox and connecting means.

In FIG. 3, the crashbox 1 or the protruding portion 4 is partly inserted into the seating opening in the support frame although contact between the end faces of the first and third chamber pointing towards the protruding portion 4 and the support frame 7 has not yet occurred (i.e., the crashbox 1 has not as yet been inserted into the seating opening in the support frame as far as the stop means). For this reason, all of the connecting elements are also not yet illustrated. FIG. 4 shows a section of an arrangement in which the crashbox 1 is completely inserted into the seating opening in the support frame.

FIG. 4 shows a schematic, perspective view of another section of a damping arrangement 6 with a support frame 7, a crashbox 1 and connecting means 5. In FIG. 4, the protruding portion 4 of the crashbox has been completely inserted into the seating opening in the support frame up to the stop means and is secured to the support frame 7 with the aid of the connecting means 5. The connecting means 5 comprise the through openings as well as the bolting and or plug-in means which extend through the through openings and thereby realize a substantially positive connection. In turn, the bolting or plug-in means comprise a head and a nut element, this thereby preventing axial movement out of the through openings. Reinforcement means are provided for the damping arrangement 6 in order to withstand a high load. These are clearly visible in FIG. 5. In addition, the rear frame part comprises a reinforcement in the form of a framework shoe 7b, whereby the rigidity or firmness of the support frame 7 is additionally increased.

FIG. 5 shows a schematic, perspective view of another section of a damping arrangement 6 in accordance with FIG. 4 from another angle. In particular here, reinforcement means 8 are formed which, in the present case, comprise a sheet metal element 9 having reinforcement ribs 10 as well as a reinforced area 11 which is matched to the outer contour of the support frame and at least partly surrounds the support frame. The reinforcement means 8 can additionally comprise a framework shoe 7b or the reinforcement means 8 are additionally formed as a framework shoe 7b. The connecting means 5 a bolting means together with a through opening pass through both the reinforced area 11, the sheet metal element 9, the support frame 7 and the profile of the crashbox in a substantially horizontal direction transverse to the direction of insertion. The sheet metal element 9 which, as described, can be a component of the framework shoe 7a or a separate reinforcement means 8 is matched to the outer contour of the support frame 7 and has substantially the same contour as the outer contour of the support frame 7 (i.e., the inner contour of the sheet metal element 9 substantially corresponds to the outer contour of the support frame 7.) The reinforcement ribs 10 serve substantially for increasing the rigidity and improving the support of the arrangement and are inclined in the longitudinal direction. Since the support frame 7 is likewise inclined when viewed in cross section (i.e., it is in the form of a trapezoid) and hence too the sheet metal element 9 is formed accordingly, the connecting region 11 is in the form of a bulge-like thickening or a material reinforcement in the region of the connecting means 5 for the purposes of improving the connection of the support frame 7 and the crashbox by means of the connecting means 5. This is illustrated more clearly in the enlarged illustration in FIG. 6. The rear floor B is also represented schematically in order to schematically illustrate the entire arrangement.

FIG. 6 shows a schematic, perspective view of a section of the damping arrangement which shows the connecting means 5 and the reinforced area 11 on an enlarged scale. Since, in a cross sectional view, the contour of the support frame 7 and hence too that of the sheet metal element extend at a slight inclination—trapezoidally—with respect to the flat surface of the head or the nut element of the bolting means for example, there is provided a bulge-like reinforced area 11 which is likewise inclined in such a manner that this gap between, for example, the nut element or the head element and the surface of the support frame or the sheet metal element is compensated and a substantially flat contact surface for the bolting means is realized. This bulge-like reinforced area 11 of differing thickness is schematically highlighted by the circle illustrated in FIG. 6 as well as the arrow pointing thereto.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope o as set forth in the appended claims and their legal equivalents.

LIST OF REFERENCE SYMBOLS 1 crashbox
2 profile (wall)
3 chamber
3a first chamber
3b second chamber
3c third chamber
4 protruding portion
5 connecting means
6 damping arrangement
7 support frame
7a rear frame part
7b framework shoe
8 reinforced region
9 sheet metal element
10 reinforcement rib
B rear floor

The invention claimed is:

1. A crashbox for absorbing impact energy which is suitable for insertion into a motor vehicle support frame, and which has a deformable profile, comprising:
   a first chamber tubular in a direction of insertion; the direction of insertion is parallel to a longitudinal axis of the first chamber;
   a second chamber tubular in the direction of insertion formed adjacent to the first chamber; and
   a wall of the deformable profile surrounding the first chamber and the second chamber,
   wherein one of the first chamber or the second chamber is formed such as to be shorter in a direction of insertion and the other of the first chamber or the second chamber has a protruding portion which is adapted to be inserted into the support frame in order to realize a coupling between the crashbox and the support frame, and
   wherein the protruding portion has a first connector adapted to connect the protruding portion to the support frame.

2. A crashbox in accordance with claim 1, wherein the first connector is a substantially horizontally effective connector.

3. A crashbox in accordance with claim 1, wherein the first connector is a through opening in order to realize a connection that taken in conjunction with at least a second connector.

4. A crashbox in accordance with claim 1, wherein the deformable profile is formed in one-piece.

5. A crashbox in accordance with claim 1, wherein the deformable profile is manufactured with an extrusion process.

6. A crashbox in accordance with claim 1, wherein the deformable profile is formed from an extrudable material.

7. A crashbox in accordance with claim 1, wherein the wall surrounding the first chamber and the second chamber has different wall thicknesses for different degrees of deformation.

8. A crashbox in accordance with claim 1, wherein the deformable profile has a third chamber which is likewise shortened with respect to the first chamber or the second chamber with the protruding portion and is arranged relative to the other two chambers in such a manner that the first chamber or the second chamber with the protruding portion is arranged in sandwich-like manner between the two shortened chambers.

9. A damping arrangement for absorbing impact energy for a motor vehicle, comprising:
   a support frame including a seating opening; and
   a crashbox adapted for insertion into the seating opening, the crashbox comprising:
   a first chamber tubular in a direction of insertion; the direction of insertion is parallel to a longitudinal axis of the first chamber;
   a second chamber tubular in the direction of insertion formed adjacent to the first chamber; and
   a wall of a deformable profile surrounding the first chamber and the second chamber,
   wherein one of the first chamber or the second chamber is formed such as to be shorter in a direction of insertion and the other of the first chamber or the second chamber has a protruding portion which is adapted to be inserted into the support frame in order to realize a coupling between the crashbox and the support frame, and
   wherein the protruding portion has a first connector adapted to connect the protruding portion to the support frame
   wherein an inner contour of the seating opening substantially corresponds to an outer contour of the protruding portion of the crashbox in order to seat the crashbox by means of a process of inserting the protruding portion into the seating opening.

10. A damping arrangement in accordance with claim 9, further comprising a second connector which correspond to the first connector of the crashbox and cooperates therewith in order to realize an additional connection between the support frame and the crashbox.

11. A damping arrangement in accordance with claim 10, wherein the first connector and the second connector are aligned substantially in a horizontal direction.

12. A damping arrangement in accordance with claim 9, further comprising a reinforcement comprising a reinforced area on an outer contour of the support frame in a region in which the first connector mutually co-operates in order to at least reduce inadvertent damage in the region.

* * * * *